(12) United States Patent
Gillespie

(10) Patent No.: US 6,679,352 B2
(45) Date of Patent: Jan. 20, 2004

(54) VEHICLE DRIVE CHAIN LUBRICATOR

(76) Inventor: James Gillespie, 359 Webbs Mills Rd., Raymond, ME (US) 04071

( * ) Notice: Subject to any disclaimer, the term of this patent is extended or adjusted under 35 U.S.C. 154(b) by 68 days.

(21) Appl. No.: 10/045,983

(22) Filed: Oct. 29, 2001

(65) Prior Publication Data

US 2003/0079944 A1 May 1, 2003

(51) Int. Cl.$^7$ ................................................ F16N 7/02
(52) U.S. Cl. ..................... 184/15.1; 184/80; 184/105.1; 251/149
(58) Field of Search ............................... 184/15.1, 15.3, 184/80, 105.1, 105.2; 222/529, 185.1; 251/144, 297

(56) References Cited

U.S. PATENT DOCUMENTS

| 508,485 A | * | 11/1893 | Mowrer et al. | ............ 184/15.1 |
| 840,345 A | * | 1/1907 | Klemm | ....................... 184/15.1 |
| 3,742,582 A | * | 7/1973 | Broske | ....................... 228/107 |
| 3,837,360 A | * | 9/1974 | Bubula | ................... 137/625.46 |
| 3,896,901 A | * | 7/1975 | Ango | ........................ 184/15.1 |
| 4,061,158 A | * | 12/1977 | Musial | .................... 137/552.5 |
| 5,542,498 A | * | 8/1996 | Boelkins | ..................... 184/7.4 |

FOREIGN PATENT DOCUMENTS

| JP | 60125497 A | * | 7/1985 | ............. F16N/7/14 |

* cited by examiner

Primary Examiner—Marcus Charles
Assistant Examiner—Timothy McAnulty
(74) Attorney, Agent, or Firm—William F. Hamrock, PA

(57) ABSTRACT

A gravity dispensing flow lubricator for a drive chain operated vehicle, such as a motorcycle, and a method of lubricating the vehicle. The device, mounted on the vehicle, provides a cylindrical container which dispenses lubricant by a manually operated flow valve therein providing a flow orifice which aligns the flow of lubricant to an adjustable flexible flow line which is fixedly set to dispense the lubricant to various areas of the drive chain. The discharge of specific amounts of lubricant by the flow valve is controlled by a spring pressured ball bearing frictionally engaging a plurality of indented seats in the unit.

4 Claims, 3 Drawing Sheets

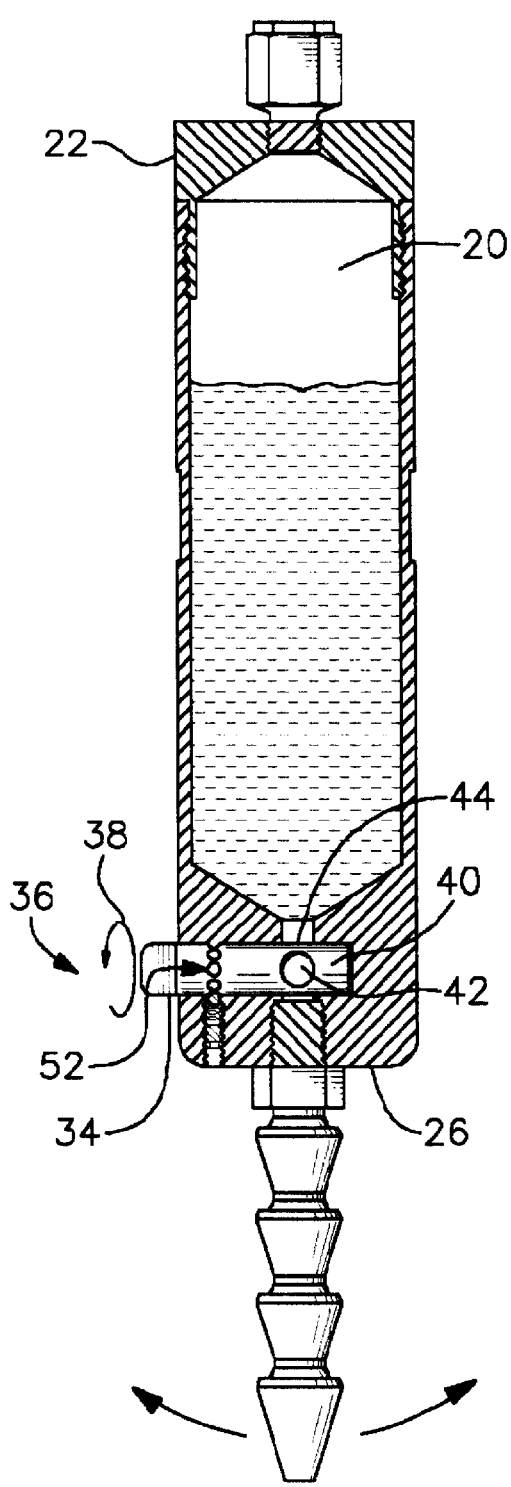
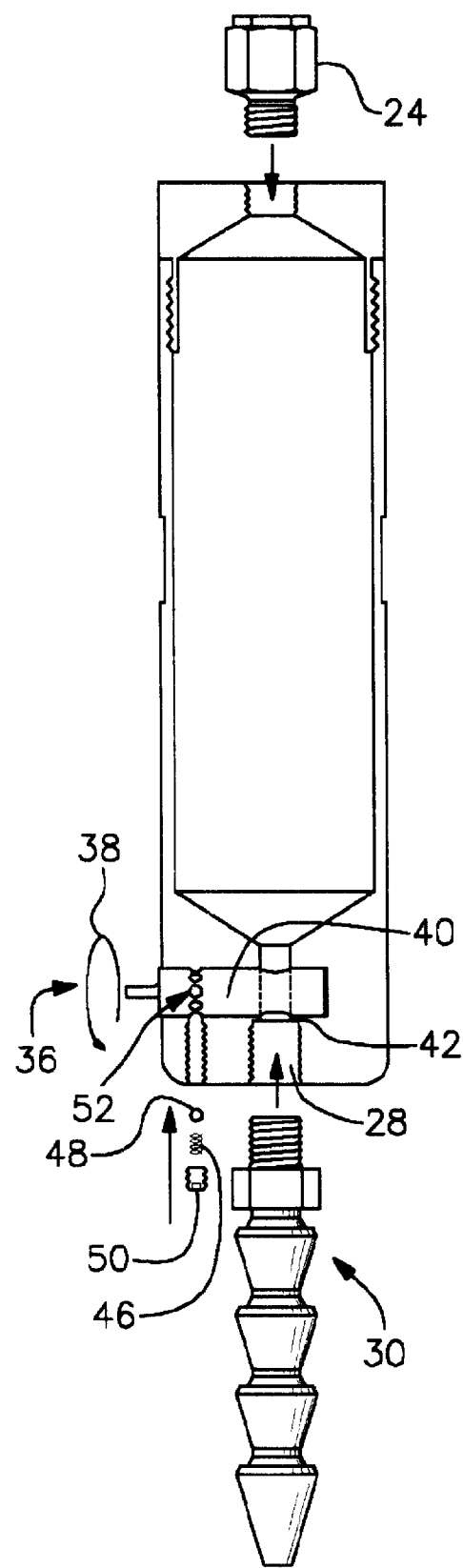
Fig. 2
Fig. 3

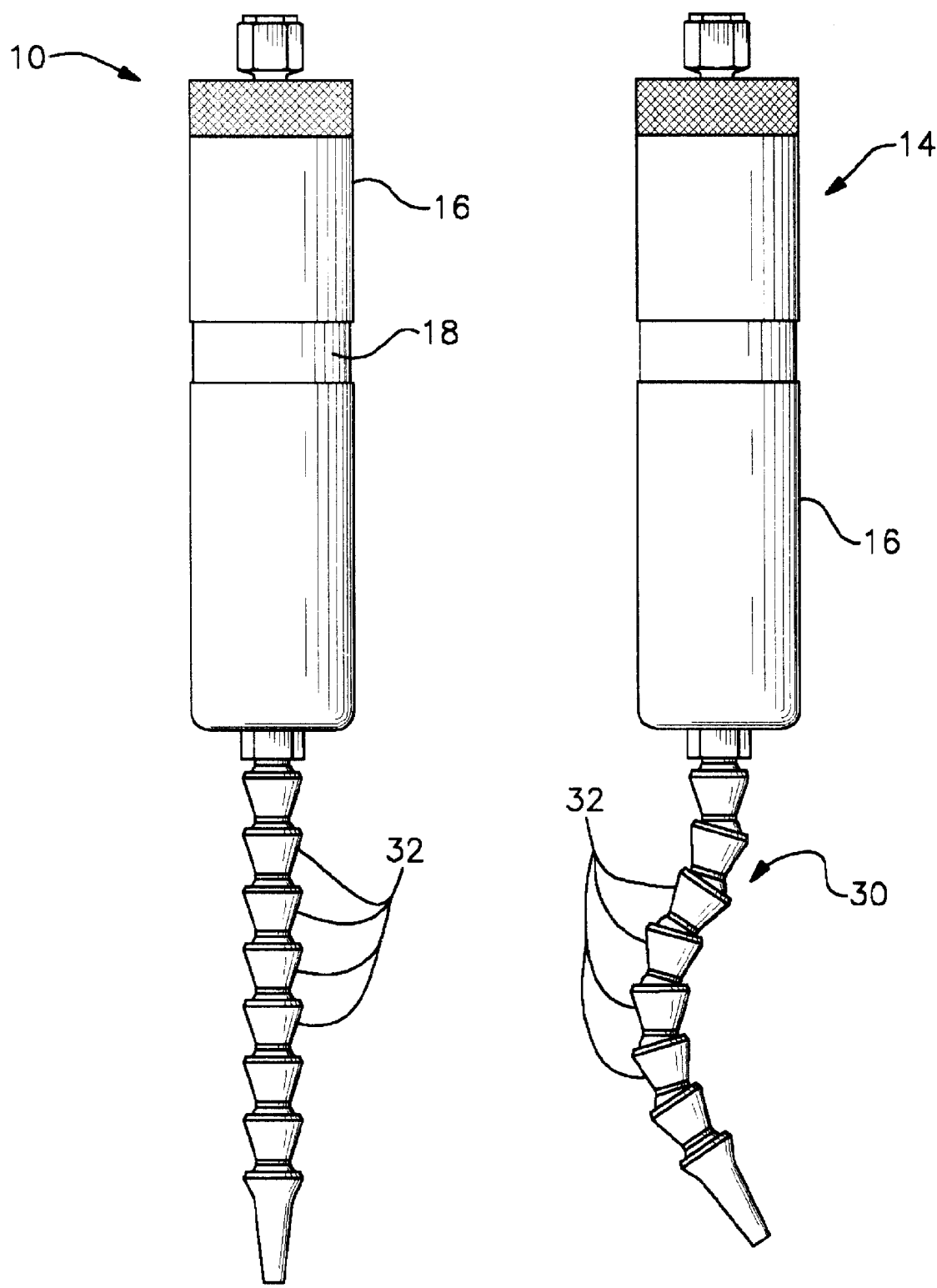

VEHICLE DRIVE CHAIN LUBRICATOR

BACKGROUND OF THE INVENTION

The invention relates to a lubrication device for a motorcycle drive chain, or the like, and more particularly, to a manually operated gravity feed oil lubricator removably attachable to the motorcycle frame for uniformly depositing a contiuous thin film of oil on the drive chain.

Service manuals for drive chains on motorcycles and the like require proper lubrication with oil in order to increase the life of the chain and to prevent chain breaks, corrosion or other malfunctions. Preferably, a controlled thin coating of oil should be deposited uniformly to the chain at various intervals to keep the chain continuously oiled. There have been many devices proposed for oiling the chain when the vehicle is at rest or moving but with various limits of success. Some of these devices relate to chain oilers having a reservoir container and some type of means for controlling the discharge of the oil either automatically or manually. A major problem with many of these known reservoir container applications is that the devices are complicated, in that they may require electrical motors, or require pressurized containers, or require spraying devices; or the device may not adequately lubricate the chain, or they may perform a messy operation, or they may be difficult to maintain and use, or they may fail to provide a continuous coating of oil uniformly dispersed on the chain.

In light of the this situation, there is a need for an inexpensive, simple, easy to use manually operated drive chain lubricator, which is strategically located on the frame of the motorcycle and provides a continuous, uniform film of oil on the drive chain. Applicant's present unique drive chain lubricator and its method of operation as discussed herein satisfies this need.

SUMMARY OF THE INVENTION

In accordance with the present invention, there is provided a manually operable unique, simple, gravity feed, adjustable flow lubricator which is removably mountable upright by means of a mechanical support on a frame member of a motorcycle. A cylindrical oil container to be generally partially filled with lubricant is releasably located above the drive chain. A manual flow valve positioned on the side of the container in conjunction with a relief air vent in a threadedly sealed cap at the top container are provided to regulate the flow of lubricant into an adjustable flow line. The unique structure of the adjustable flow line permits it to be adjustably positioned to drip the oil directly on specific areas of the chain which provide the best uniform lubrication. Generally, the rider can manually adjust a specific amount of flow of the lubricant on the chain, and then drive the motorcycle for about twenty to thirty seconds to uniformly disperse a film of oil uniformly over the entire chain. Also, a contiuous limited flow of lubricant to the chain can be regulated by means of the unique structure of the flow valve permitting the vehicle to be driven for long periods of time while the chain is being lubricated.

BRIEF DESCRIPTION OF THE DRAWINGS

These and other features and advantages of the invention will be apparent from the following description, appended claims and accompanying drawings, the various views will be briefly described as follows.

FIG. 2 is a partial cross sectional view of the reservoir container partially filled with lubricant.

FIG. 3 is an exploded assmbly view of the adjustable flow lubricator

FIG. 4 is a showing of a longer flexible flow line.

FIG. 5 is view of how the flexible flow line can be positioned in place.

DETAILED DESCRIPTION OF THE PREFERRED EMBODIMENT

Figure 1:
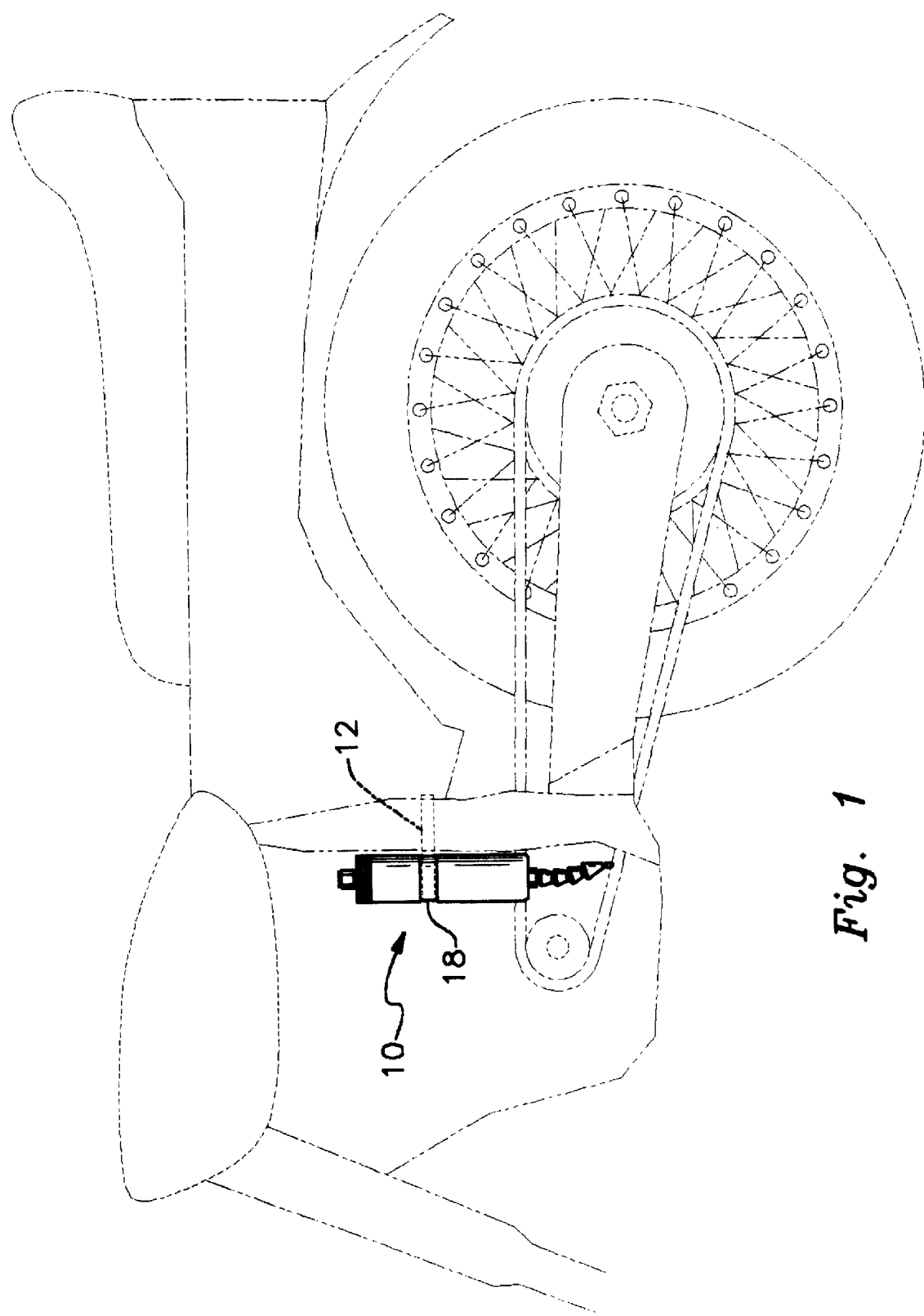
FIG. 1 is a sectional view of a conventional motor cycle in broken lines with the adjustable flow lubricator secured in position.

Referring now in particular to the accompanying drawings, shown in FIG. 1 is a sectional side view of a conventional motor cycle in broken lines with the adjustable flow lubricator of the invention generally indicated at 10 secured thereto. Adjustable flow lubricator 10 as depicted in FIGS. 1, 2, 3, 4 and 5 includes a support mechanism 12 which removably mounts cylindrical oil container 14 to the frame of the motorcycle above the chain. Oil container 14, preferably made of 6061 aluminum alloy, encompasses a continuous cylindrical wall 16 provided with an indented circumferential groove 18 which is frictionally engaged by support mechanism 12 in securing the oil container to the vehicle. Substantially circular access opening 20 on the top of the oil container is releasably enclosed by knurled screw head closure member 22 having a threadedly engaged vacuum relief air vent 24 extending upwardly at its top. Oil container 14 is closed at its bottom end by circular wall closure 26 having bottom outlet port 28 generally located in its central portion. Outlet port 28 is in fluid communiction with threadedly engaged flow line 30 extending downwardly therefrom. The flow line includes individually knobbed plastic elements 32 which can be manually adjusted to a fixed position to direct the flow of oil to selected areas of the drive chain as shown in FIG. 5. Oil container 14 defines an inner channel 34 sized to slidably receive a manually adjustable flow valve 36, best seen in FIGS. 2 and 3, extending part way through the interior lower area of the oil container. The flow valve includes an exterior manually operated flow regulator handle 38 operativly connected to horizontal arm 40 in positioning flow regulator orifice 42 in and out of alignment with outlet channel 44 of the oil container in controlling the flow of lubricant to the flow line. The discharge of specific amounts of lubricant is controlled by spring 46 pressuring ball bearing 48 by means of threaded nut 50 to frictionally engage any one of indented seats 52 in arm 40. Generally, there are about four to eight circumferentially indented seats which position a full or partial opening alignment of orifice 42 with outlet channel 44 thereby exactly measuring the amount of lubricant discharged to the chain.

In operation, the adjustable flow lubricator is releasably mounted in an upright position on the motorcycle frame by means of the support mechanism as seen in FIG. 1. Generally, the oil container is partially filled with lubricant through the access opening which is then securely sealed by the knurled screw closure member. The lubricant is gravity fed from the oil container to lubricate the motorcycle chain when the motorcycle is stopped or in motion. The flow of lubricant is controlled by means of the off/on manually controlled flow valve. The present invention permits the rider to be able to accurately control the flow of lubricant to the drive chain by means of the unique flow valve and the adjustable flow line. It is the particular feature of the spring pressured ball bearing selectively pressing against the selective indented seats in the internal arm of the flow valve which permits a more accurate control of lubricating the drive chain. It is also the feature of the secured positioning of the flow line on specific areas of the drive chain which permits controlled amount of lubricant to be continuously deposited on these specific areas of the drive chain which provides improved lubrication of the drive chain. It is a further feature of the combined functioning of the vacuum relief air vent, the flow valve and the flow line which permits controlled uniform dispersion of the lubricant on the drive chain.

A simple and inexpensive arrangement of a gravity fed, manually operated, adjustable flow lubricator releasably attachable to a motorcycle frame which regulates a uniform dispersion of lubricant to the drive chain while the vehicle is in motion or not moving has been described. While the present invention has been described and illustrated with respect to the preferred embodiment, it will be appreciated that numerous variations of the embodiment may be made without departing from the scope of the invention which is defined in the appended claims.

What is claimed is:

1. A flow lubricator attachable to a frame member of a drive chain operated vehicle comprising;

a hollow cylindrical container having a solid base which gravity dispenses lubricant therefrom, said container having a side wall with an open top access area and an enclosed solid base having an inlet port and an outlet port, and a manually operated flow valve operatively mounted and protected in an inner horizontal channel within the enclosed solid base, a cover for engaging and sealing the open top access area of the container, said cover having a vacuum relief air vent, an adjustable, flexible flow line having a front end in internally threaded secured communication with said outlet port and an opposite end, said flowline having individual knobbed elements frictionally engaged to be manually adjusted to a fixed position over the drive chain, whereby said protected flow valve aligns the flow of lubricant to the output port, and whereby said flow line opposite end is in said fixed position above the chain to deposit the lubricant on areas of the drive chain.

2. The flow lubricator according to claim 1 which is releasably attachable to the frame by means of a support mechanism.

3. The flow lubricator according to claim 1 wherein said flow valve includes an manually adjustable handle operatively engaged with an interior horizontal arm providing a flow orifice movingly alignable with said container and said bottom outlet port.

4. The flow lubricator according to claim 3 wherein a spring pressured ball bearing frictionally engages indented seats in said horizontal arm.

* * * * *